(12) United States Patent
Horkko et al.

(10) Patent No.: US 8,939,806 B2
(45) Date of Patent: Jan. 27, 2015

(54) RETRACTABLE PROPULSION CONTAINER WITH THRUSTER

(71) Applicant: Beacon Finland Ltd Oy, Rauma (FI)

(72) Inventors: Tuija Horkko, Rauma (FI); Timo Rintala, Rauma (FI); Juhani Suutari, Rauma (FI)

(73) Assignee: Beacon Finland Ltd Oy, Rauma (FI)

( * ) Notice: Subject to any disclaimer, the term of this patent is extended or adjusted under 35 U.S.C. 154(b) by 0 days.

(21) Appl. No.: 14/346,710

(22) PCT Filed: Mar. 15, 2013

(86) PCT No.: PCT/EP2013/055338
§ 371 (c)(1),
(2) Date: Mar. 21, 2014

(87) PCT Pub. No.: WO2013/135858
PCT Pub. Date: Sep. 19, 2013

(65) Prior Publication Data
US 2014/0227097 A1    Aug. 14, 2014

(30) Foreign Application Priority Data

Mar. 16, 2012 (EP) .................................... 12159782
Apr. 30, 2012 (EP) .................................... 12166135

(51) Int. Cl.
*B63H 5/125* (2006.01)
*B23P 6/00* (2006.01)
(52) U.S. Cl.
CPC . *B63H 5/125* (2013.01); *B23P 6/00* (2013.01);
*B63H 2005/1254* (2013.01)
USPC .......................................................... 440/54

(58) Field of Classification Search
USPC ............................................................ 440/54
IPC .......................................................... B63H 5/20
See application file for complete search history.

(56) References Cited

U.S. PATENT DOCUMENTS 2,466,635 A * 4/1949 Brown et al. .................... 440/54
2,885,990 A   5/1959 Hawthorne ...................... 115/35

(Continued)

FOREIGN PATENT DOCUMENTS

GB         991704        5/1965
JP        H06-316289    11/1994

(Continued)

*Primary Examiner* — Stephen Avila
(74) *Attorney, Agent, or Firm* — James C. Lydon

(57) ABSTRACT

The present invention relates to a propulsion container (1) comprising space for a propeller driver, the propulsion container having a first end (3) and a second end (4), said second end (4) having a surface; a trunk (5) inside which the propulsion container (1) is moveably mounted, allowing the propulsion container (1) to be moved between a first position and a second position; a first sealing arrangement (6, 7) arranged to seal, in the first position of the propulsion container, a first gap between the propulsion container (1) and the trunk (5) to define a first watertight space on a second side of the first sealing arrangement, and a second sealing arranged essentially at the second end (4) of the propulsion container (1) and arrangement (8) arranged to seal, in the second position of the propulsion container, a second gap between the propulsion container (1) and the trunk (5) to define a second watertight space on a second side of the second sealing arrangement, said second sealing arrangement (8) comprising a primary propulsion container seal (9) arranged in a functional connection with the surface of the second end (4) of the propulsion container (1).

10 Claims, 6 Drawing Sheets

(56) References Cited

U.S. PATENT DOCUMENTS

| | | | |
|---|---|---|---|
| 4,075,971 A * | 2/1978 | Reginensi et al. | 440/54 |
| 5,125,858 A * | 6/1992 | Salvetti | 440/54 |
| 5,397,255 A | 3/1995 | Heer | 440/54 |
| 6,375,524 B1 | 4/2002 | Commandeur et al. | 440/54 |
| 6,439,936 B1 | 8/2002 | Dreith et al. | 440/54 |

FOREIGN PATENT DOCUMENTS

| | | |
|---|---|---|
| JP | 2002-544028 | 12/2002 |
| WO | WO 99/20524 | 4/1999 |
| WO | WO 2010/100313 | 9/2010 |
| WO | WO 2011/031158 | 3/2011 |

* cited by examiner

RETRACTABLE PROPULSION CONTAINER WITH THRUSTER

FIELD OF THE INVENTION

The present invention relates to a retractable thruster arrangement. The invention also relates to a vessel comprising at least one thruster arrangement according to this invention and to a method for servicing a propeller driver.

BACKGROUND OF THE INVENTION

Semi-submersible heavy lift ships, also known as float-on/float-off ships, are known for transporting very large and/or heavy cargo such as drilling rigs or other vessels etc. These ships are submerged in water such that the water line is above the deck level of the ship, the cargo is loaded and the ship lifted to its normal transit position. The propellers of these ships thus may need to be retracted within the baseline of the ship, enabling the vessel to enter shallow waters (harbours), as well as reducing resistance when not in use during transit.

Retractable thruster arrangements are known in the art and described for example in the documents U.S. Pat. No. 6,439,936 and U.S. Pat. No. 6,375,524. In the document U.S. Pat. No. 6,439,936, the thruster is however elevated above the ship's deck level. This reduces the usable surface area of the deck and by changing the ship's centre of gravity, also makes it more unstable. The document U.S. Pat. No. 6,375,524 describes another retractable thruster that is elevated above the ship's deck level for servicing of the propulsion device. The document describes an intermediate position wherein the thruster is retracted to keel level without any significant structure projecting along the deck level. However, in this intermediate position, there is no possibility to seal the device such that the propeller could be serviced.

The document WO 2010/100313 also describes a retractable thruster comprising a closing device that allows the servicing of the propulsion unit even when the propulsion device is below the water line of the vessel. This kind of equipment is however quite expensive and therefore not economical in all kinds of vessels. Morover, document U.S. Pat. No. 2,466,635 discloses a screw propeller steering and depth regulation apparatus, wherein the propeller can be withdrawn within the contour of the hull when the vessel is in shallow water or is to be propelled by other means. The apparatus has a well-like structure which carries the propulsive unit telescoped in a three-part telescopic well structure. The well structure has two sealing rings in annular grooves in the exterior of the well sections. Document WO 2011/031158 discloses a vessel with a retractable thruster assembly, wherein its casing structure comprises also two sealing devices arranged on the sides of the thruster well.

OBJECTS AND SUMMARY OF THE INVENTION

It is the main objective of the present invention to reduce or even eliminate at least some of the problems encountered in the prior art as presented above.

It is an objective of the present invention to provide a retractable thruster arrangement where the propeller driver can be serviced also when the thruster is retracted, while at the same time being able to retract the thruster within the ship's own structure and not above the deck level.

In order to realise the above-mentioned objectives, the arrangement and vessel according to the invention are characterised by what is presented in the characterising parts of the appended independent claims. Advantageous embodiments of the invention are described in the dependent claims.

A typical retractable thruster arrangement according to this invention comprises
- a propulsion container comprising space for a propeller driver, the propulsion container having a first end and a second end, said second end having a surface,
- a trunk inside which the propulsion container is moveably mounted, allowing the propulsion container to be moved between a first position and a second position,
- a first sealing arrangement arranged to seal, in the first position of the propulsion container, a first gap between the propulsion container and the trunk to define a first watertight space on a second side of the first sealing arrangement, and
- a second sealing arrangement arranged essentially at the second end of the propulsion container and arranged to seal, in the second position of the propulsion container, a second gap between the propulsion container and the trunk to define a second watertight space on a second side of the second sealing arrangement, said second sealing arrangement comprising a primary propulsion container seal arranged in a functional connection with the surface of the second end of the propulsion container.

A typical vessel according to this invention comprises at least one retractable thruster arrangement according to this invention and an opening for accessing the thruster arrangement, said opening being essentially smaller than the cross-section of the propulsion container.

A typical method for servicing a propeller driver arranged in a propulsion container of a retractable thruster arrangement in a vessel, said propulsion container having a first position wherein the propeller is below the base line of the vessel and a second position wherein the propeller is above the base line of the vessel, comprising the steps of
- in the first position of the propulsion container, with a first sealing arrangement, forming a first watertight space above the upper surface of the propulsion container and below the water line, thus rendering the propulsion container accessible, and
- in the second position of the propulsion container, with a second sealing arrangement, forming a second watertight space above the upper surface of the propulsion container and below the water line, thus rendering the propulsion container accessible.

DETAILED DESCRIPTION OF THE INVENTION

Figure 1:
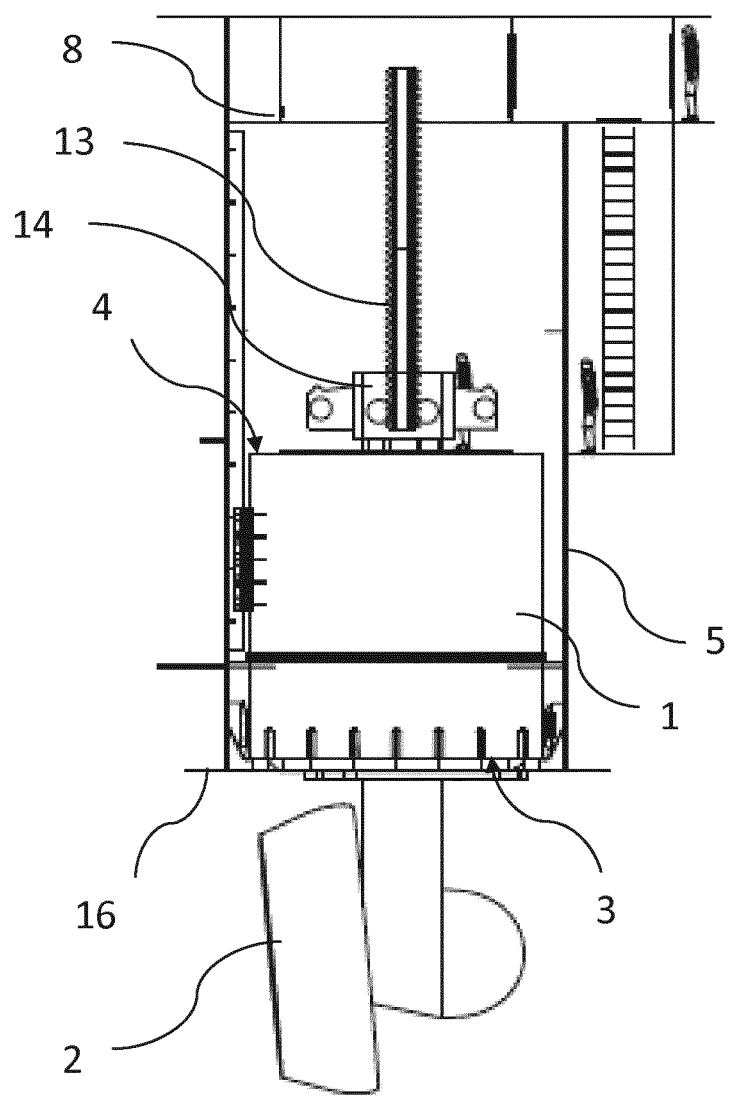
FIG. 1 illustrates an embodiment of a thruster propulsion container arrangement according to this invention, in its first position as a side view.

A typical retractable thruster arrangement according to this invention comprises

- a propulsion container comprising space for a propeller driver, the propulsion container having a first end and a second end, said second end having a surface,
- a trunk inside which the propulsion container is moveably mounted, allowing the propulsion container to be moved between a first position and a second position,
- a first sealing arrangement arranged to seal, in the first position of the propulsion container, a first gap between the propulsion container and the trunk to define a first watertight space on a second side of the first sealing arrangement, and
- a second sealing arrangement arranged essentially at the second end of the propulsion container and arranged to seal, in the second position of the propulsion container, a second gap between the propulsion container and the trunk to define a second watertight space on a second side of the second sealing arrangement, said second sealing arrangement comprising a primary propulsion container seal arranged in a functional connection with the surface of the second end of the propulsion container.

In other words, the present invention provides a thruster arrangement, where the space above the propulsion container is sealed from water with a double sealing system, i.e. water can be kept away from this space, both in its lower position (the first position) and its upper position (the second position). The propulsion unit itself is a water-tightly closed container, as it typically contains the propeller driver and its auxiliaries. In this way, the propulsion container, the propeller driver and its auxiliaries installed inside the propulsion container can be serviced irrespective of the position of the propulsion container. Thus the only moment when water can enter this space is when the propulsion container is moved. After the propulsion container has been locked to either its first or second position, the water is pumped away. Indeed, in the upper position, water is pumped out from the inside of the space and in the lower position, the trunk is emptied of water. Typically, the propulsion container is at least mainly below the waterline of the vessel in all its positions.

The words "thruster" and "thruster arrangement" can be used interchangeably. The first position is the lower position when the thruster is installed in a vessel, i.e. the position in which the propeller is in its operating position. The second position is the upper position when the thruster is installed in a vessel, i.e. the position in which the propeller is retracted inside the base line of the vessel, above its base line. Similarly, the first ends or sides stand for the lower ends or sides and the second ends or sides stand for the upper ends or sides, when the thruster is installed in a vessel. Typically, the propulsion container is movable along its vertical longitudinal axis.

By watertight space it is meant a space wherein no essential amount of water can enter, preferably no water at all. The seals thus form a waterproof connection between the trunk and the propulsion container by closing the small gap between them. The size of the gap is typically in the order of centimetres, for example about 20 cm.

The trunk of the thruster arrangement is open at its first end, i.e. at its lower end when the arrangement is installed in a vessel. Thus the propeller can be moved from the outside of the vessel to inside the vessel, i.e. within the hull construction.

The second sealing arrangement is arranged essentially at the second end of the propulsion container and it comprises a primary propulsion container seal arranged in a functional connection with the surface of the second end of the propulsion container. Preferably, the primary propulsion container seal is arranged on the surface of the second end of the propulsion container. The primary propulsion container seal can be attached to this surface in any known manner such as by glue, rivets, screws or bolts or it can be welded to the surface. The second gap between the propulsion container and the trunk is then sealed by this primary propulsion container seal and a part of the trunk protrudes towards it and is in contact with it once the propulsion container is in its second position. The trunk may also comprise a protruding collar that comes into contact with the primary propulsion container seal. The collar is preferably in a shape corresponding essentially to the cross-sectional shape of the propulsion container, and its diameter can be slightly smaller than the diameter of the cross-section of the propulsion container. When the thruster arrangement according to this invention is installed in a vessel, the collar may be attached to the deck and below the deck of the vessel. In this case, water is pumped out from the inside of the collar when the propulsion container is in its upper position.

According to another embodiment of the invention, the second sealing arrangement further comprises a secondary sealing surface arranged on the surface of the second end of the propulsion container and a secondary propulsion container seal arranged in a functional connection with said secondary sealing surface. Preferably, the secondary sealing surface is protruding outwardly from the surface of the propulsion container, i.e. away from the surface towards the second direction.

According to a preferred embodiment, the secondary propulsion container seal is arranged on a seal holder attachable to the trunk. The seal holder may also be attached to the protruding collar as described above. The attachment of the seal holder can be made in any known manner such as by glue, rivets, screws or bolts, and the secondary propulsion container seal is attached to this holder by glue, rivets, screws, bolts etc, or they can be welded to the surfaces.

According to yet another embodiment of the invention, the first sealing arrangement is arranged essentially at the first end of the propulsion container. It preferably comprises a primary seal and a secondary seal. Even more preferably, the primary seal of the first sealing arrangement is arranged essentially at the first end of the propulsion container and the secondary seal of the first sealing arrangement is arranged at a distance D1 from said primary seal. The primary seal is thus essentially at the level of the hull or in its vicinity. The secondary seal is arranged at a distance from the primary seal, the distance D1 can be for example 40%, 60% or 80% of the distance between the first end and the second end of the propulsion container. The distance D1 can be for example 10-5000 mm, such as 2000 mm. The first sealing arrangement is preferably such that even the space between the primary and the secondary seals is watertight, i.e. the primary seal alone is sufficiently efficient to prevent water from entering into the space between the propulsion container and the trunk.

According to an embodiment of the invention, the seals are made of a suitable material such as rubber. The material needs naturally to be such to support seawater as well as warm and cold temperatures (typically from 0 to 32° C.). The seal can also be an inflatable seal known to as such. Furthermore, one or more of the seals can be made adjustable. According to a particularly preferred embodiment, the secondary seal of the first sealing arrangement is an adjustable seal.

According to an embodiment of the invention, the thruster arrangement further comprises means for moving the propulsion container between a first position and a second position.

Said means may for example comprise a drive mechanism coupled between the trunk and the propulsion container, or the hull and the propulsion container. According to an embodiment, the drive mechanism comprises a rack and a pinion drive. The rack can be arranged on the trunk or the propulsion container, whereby it is not necessary to extend the rack outside the hull and above the deck level. Any other suitable means for moving the propulsion container can naturally be used. The rack is preferably arranged in a direction that is vertical when the thruster is arranged in a vessel. According to another embodiment, the means for moving the propulsion container comprises a hydraulic cylinder or a pneumatic cylinder or several of each. It should yet be understood that also other lifting devices can be used.

According to yet another embodiment of the invention, the thruster arrangement also comprises locking means for locking the propulsion container in its first position. According to another embodiment, the thruster arrangement also comprises locking means for locking the propulsion container in its second position. The locking means can be any locking means known as such, for example primary locking pins.

In order to move the propulsion container, the mechanical lockings between the support structure of the propulsion container and the vessel hull, if used, are first unlocked. The propulsion container can still in this stage be fastened with remote-controlled locking devices in the vessel hull. In one embodiment, after this, the crew exits the trunk and closes the watertight structures of the compartment including closing valves of ventilation pipes of the trunk. The remote-controlled locking devices are unlocked and the lifting of the propulsion container can be started with lifting devices. The propulsion container having been lifted up from the sealing surfaces, water is able to access the trunk. Due to the closing valves of the ventilation pipes of the trunk, the water surface does not rise up, because an airbed has been formed in the trunk. For minimising the water volume, the space can also be pre-pressurised. It is also possible to leave the ventilation pipes or corresponding air channels unclosed, whereby the space is filled with water. The propulsion container reaching its upper position, it is locked in its upper position by means of mechanical locking device or remote-controlled locking devices. After the opening of the closing valves of the ventilation pipes, the space is emptied of water. The crew can then enter the trunk. Bringing the propulsion container in the drive position i.e. operating mode occurs in the opposite order.

A typical vessel according to this invention comprises at least one retractable thruster arrangement according to this invention and an opening for accessing the thruster arrangement, said opening being essentially smaller than the cross-section of the propulsion container.

Indeed, the opening is typically of the size of allowing the entry of a person, but not allowing the entire thruster arrangement to be extracted through this opening. The opening can also be of a size that allows extracting the propeller driver if it needs to be changed completely or cannot be serviced on the vessel. The opening can be either on the deck of the vessel or it can be on the side of the thruster arrangement, at its upper end. Typically the opening is arranged on the top part of the trunk. The opening is also equipped with a hatch or a door, that is watertight, i.e. also equipped with seals. Preferably, the opening is equipped with double door or hatch.

A typical method for servicing a propeller driver arranged in a propulsion container of a retractable thruster arrangement in a vessel, said propulsion container having a first position wherein the propeller is below the base line of the vessel and a second position wherein the propeller is above the base line of the vessel, comprising the steps of in the first position of the propulsion container, with a first sealing arrangement, forming a first watertight space above the upper surface of the propulsion container and below the water line, thus rendering the propulsion container accessible, and in the second position of the propulsion container, with a second sealing arrangement, forming a second watertight space above the upper surface of the propulsion container and below the water line, thus rendering the propulsion container accessible.

The method according to this invention thus allows the propulsion container to be serviced, i.e. the propeller driver to be accessible to maintenance at all times, except for the time when the propulsion container is in movement between its first and second positions.

The exemplary embodiments of the invention presented in this text are not interpreted to pose limitations to the applicability of the appended claims. The verb "to comprise" is used in this text as an open limitation that does not exclude the existence of also unrecited features. The features recited in the dependent claims are mutually freely combinable unless otherwise explicitly stated. The reference signs are also not to be construed as limiting the claims.

The exemplary embodiments presented in this text and their advantages relate by applicable parts to the arrangement as well as the vessel and the method according to the invention, even though this is not always separately mentioned.

DETAILED DESCRIPTION OF THE DRAWING

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

The same reference signs are used of the same or similar components in different embodiments and/or Figures.

FIG. 1 illustrates an embodiment of a thruster propulsion container arrangement according to this invention, in its first position as a side view. The first position is the lower position where the propeller 2 is below the base line 16 of the vessel. The Figure shows the propulsion container 1, the propeller drive being arranged inside it (and not shown). The first end 3 of the propulsion container 1 is its lower end and the second end 4 is its upper end. The Figure further shows the trunk 5 that is a downwardly open trunk in the structure of the vessel, in which the propulsion container 1 is vertically movable to and between the first and second positions. The second sealing arrangement 8 is at the second end 4, i.e. on top of the propulsion container and is shown in more detail in FIG. 6.

The Figure further shows the means for moving for the propulsion container, i.e. here a rack 13 and a pinion drive 14, the rack 13 being attached to the trunk 5 and not to the propulsion container.

Figure 2:
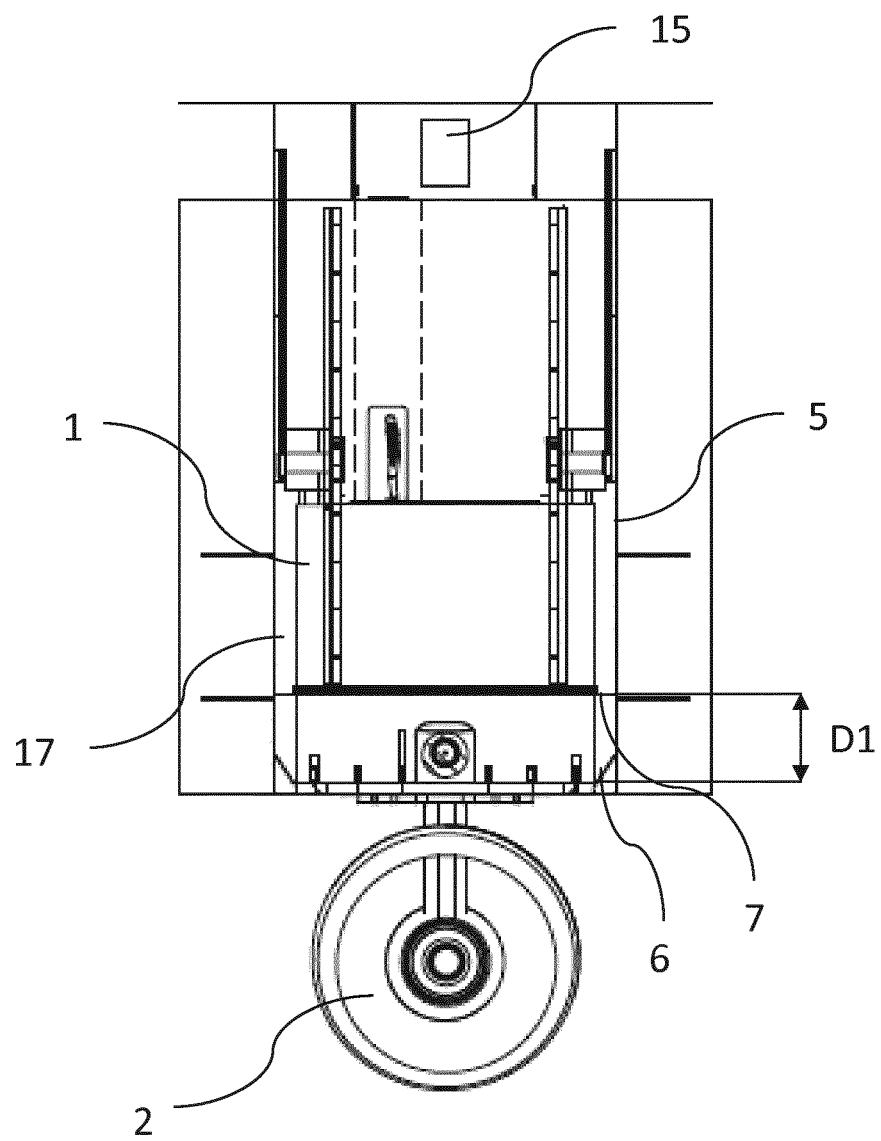
FIG. 2 illustrates the same embodiment and position as FIG. 1, as a different side view.

FIG. 2 illustrates the same embodiment and position as FIG. 1, as a different side view. In this Figure, the first gap 17 between the propulsion container 1 and the trunk 5 is shown somewhat exaggerated for sake of clarity. The first gap 17 is closed in a watertight manner with the primary seal 6 and the secondary seal 7. The secondary seal 7 is arranged at a distance D1 from the primary seal 6. The Figure also shows the opening 15, which can be a door or a hatch, and is watertight. This opening 15 allows the access to the propulsion container for servicing the propeller drive, when the propulsion container is in its second, upper position.

Figure 3:
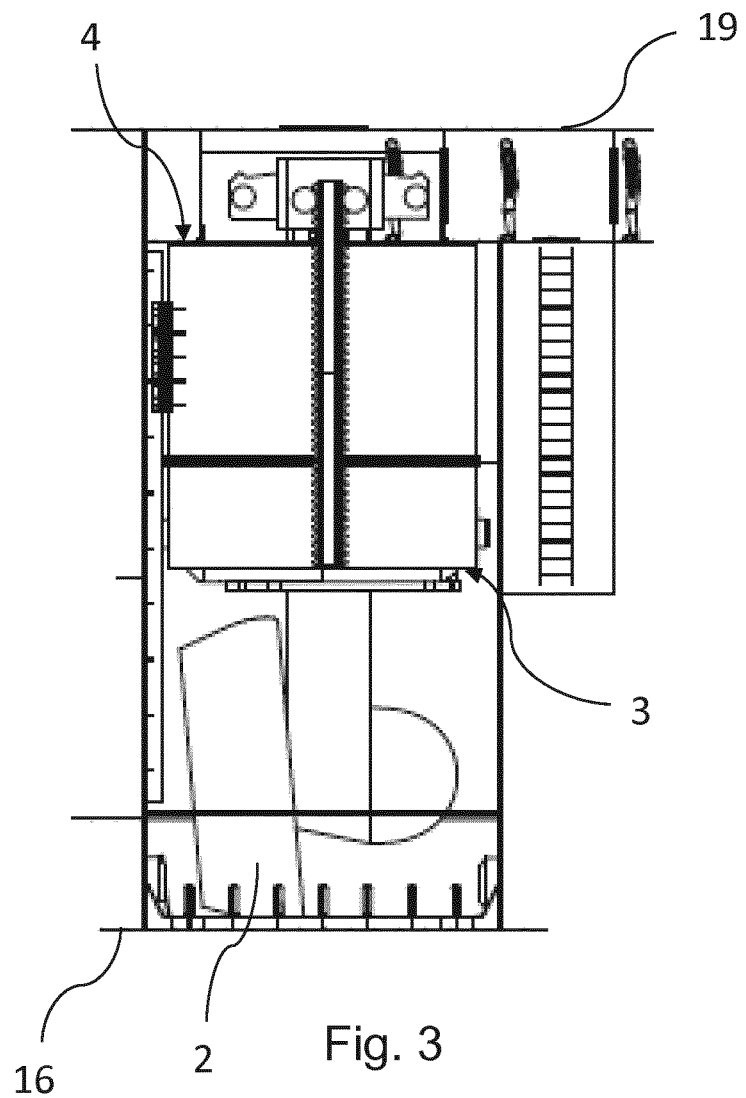
FIG. 3 illustrates the thruster arrangement of FIG. 1 in its second position as a side view.
Figure 4:
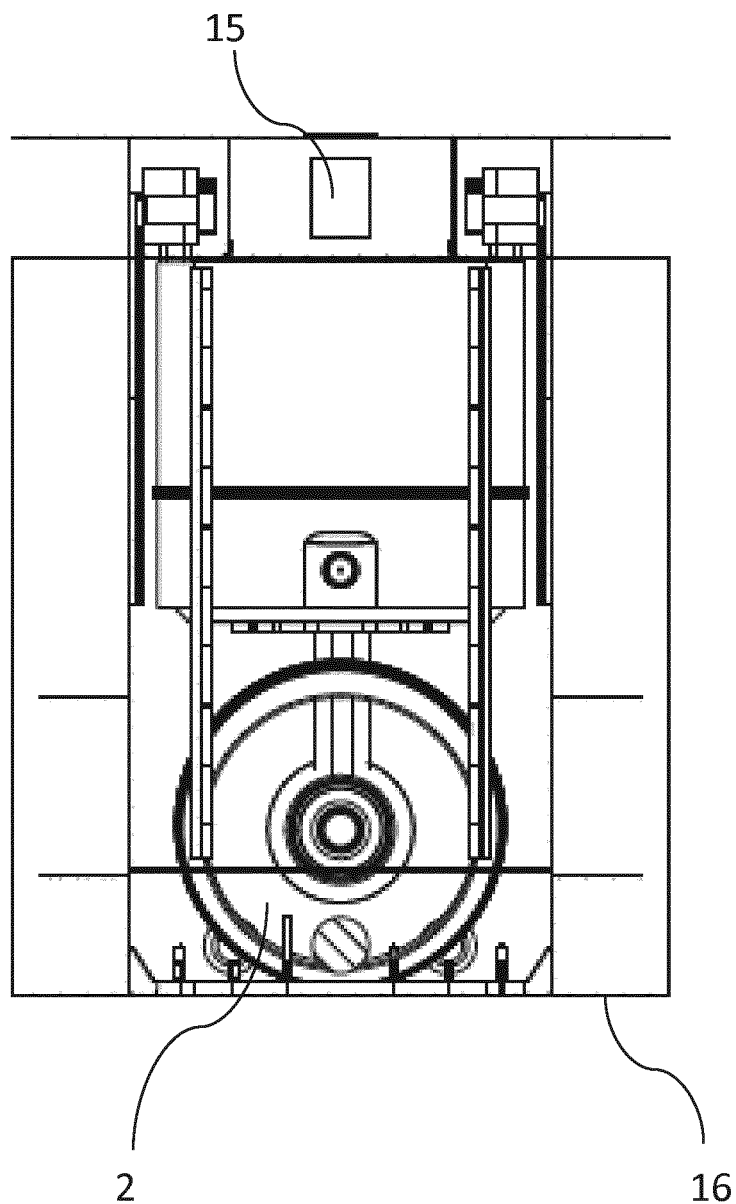
FIG. 4 illustrates the same embodiment and position as FIG. 3, as a different side view.

FIGS. 3 and 4 illustrate the thruster arrangement of FIG. 1 in its second position, i.e. its upper position, as two different side views. In this position the propeller is inside the trunk, above the base line of the vessel, and thus the vessel can be immersed in water or can enter shallow waters such as a harbour. The Figure illustrates also that as the height of the propulsion container 1 is limited and the rack 13 is attached to the trunk, the whole thruster arrangement remains below the deck 19 of the ship. Therefore, the thruster, even in its upper position, does neither hinder the loading of the cargo, nor change the centre of gravity of the vessel in a significant way.

Figure 5:
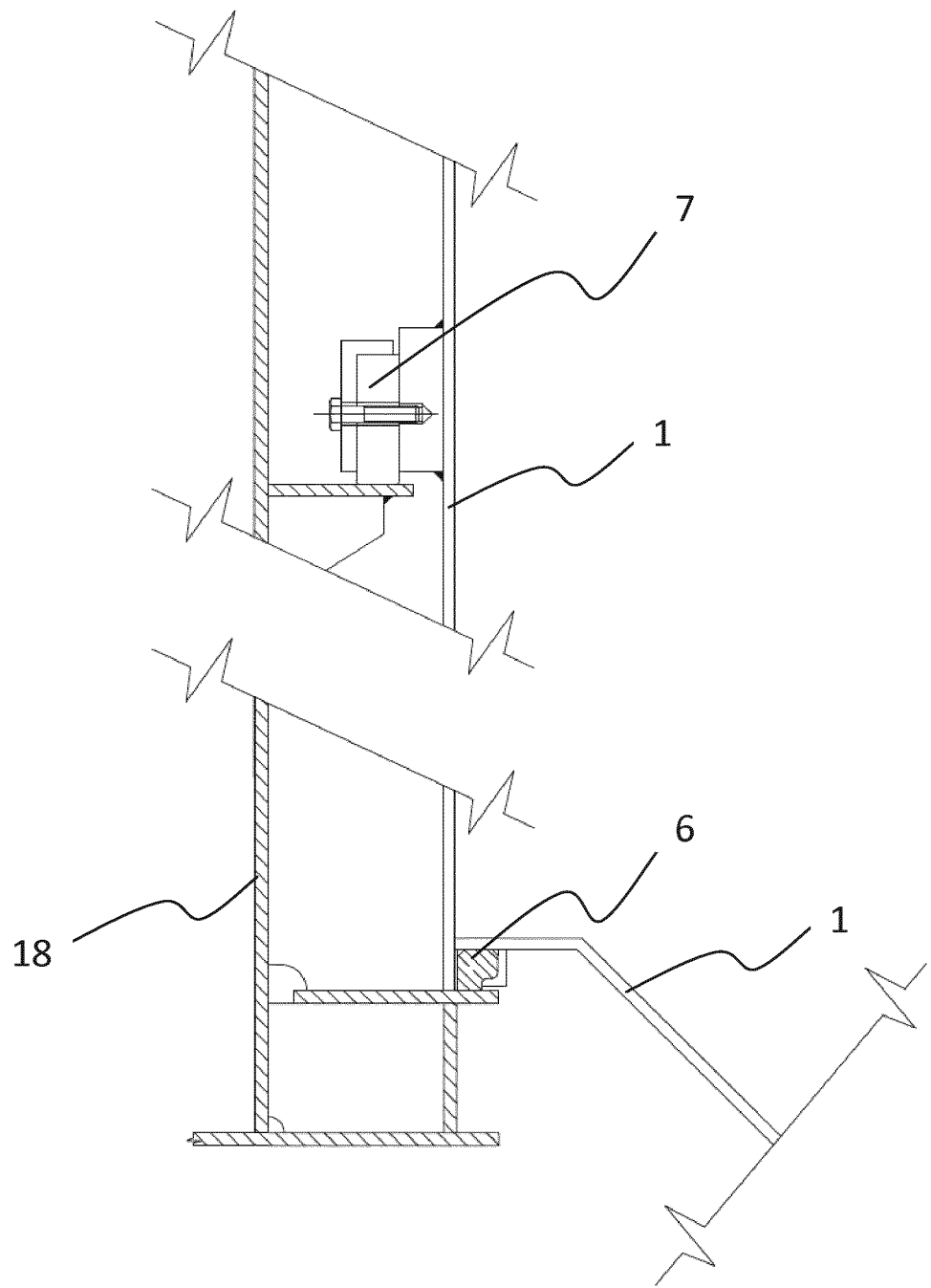
FIG. 5 shows a detail of a first sealing arrangement according to an embodiment of the invention, when the thruster arrangement is in its first position.

FIG. 5 shows a detail of a first sealing arrangement according to an embodiment of the invention, when the thruster arrangement is in its first position. In this embodiment, the secondary seal 7 is an adjustable seal. In this embodiment, the primary seal 6 is arranged on the propulsion container 1 and against a protruding part of the hull structure 18 of the vessel. The secondary seal 7 is arranged on the propulsion container 1 and against the hull structure 18. The trunk 5 and the hull structure 18 are shown in a discontinuous manner for sake of clarity, in order to show the seals 6 and 7 more clearly.

Figure 6:
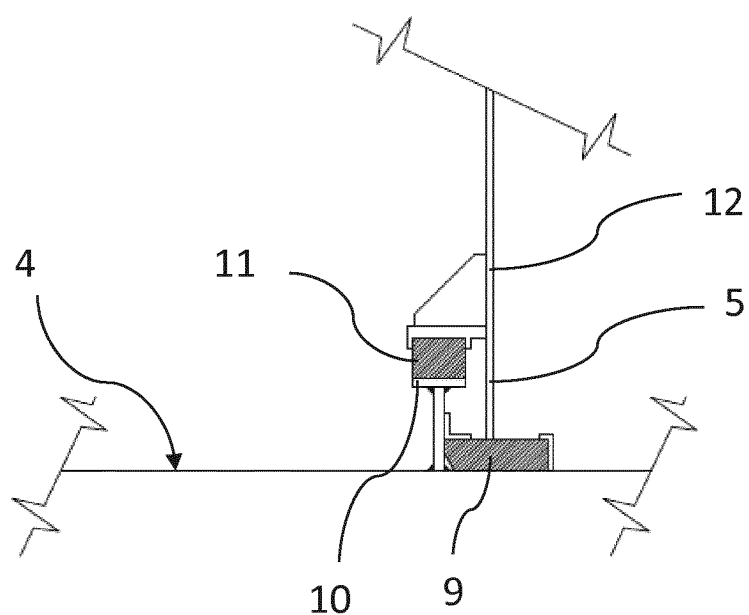
FIG. 6 shows a detail of a second sealing arrangement according to an embodiment of the invention, when the thruster arrangement is in its second position.

FIG. 6 shows a detail of a second sealing arrangement according to an embodiment of the invention, when the thruster arrangement is in its second position. This second sealing arrangement consists of two sealing members, a primary propulsion container seal 9 that is arranged on the top surface 4 of the propulsion container, and a secondary propulsion container seal 11. In this embodiment, the secondary propulsion container seal 11 is arranged to come into contact with a seal holder 12 that is attached to the trunk 5. The top 4 of the propulsion container comprises a protruding secondary sealing surface 10, against which the secondary propulsion container seal 11 is also in contact. The secondary propulsion container seal 11 can be attached either on the seal holder 12 or on the secondary sealing surface 10.

Only advantageous exemplary embodiments of the invention are described in the Figures. It is clear to a person skilled in the art that the invention is not restricted only to the examples presented above, but the invention may vary within the limits of the claims presented hereafter. Some possible embodiments of the invention are described in the dependent claims, and they are not to be considered to restrict the scope of protection of the invention as such.

The invention claimed is:

1. A retractable thruster arrangement comprising
a propulsion container (1) comprising space for a propeller driver, the propulsion container having a first end (3) and a second end (4), said second end (4) having a surface,
a trunk (5) inside which the propulsion container (1) is moveably mounted, allowing the propulsion container (1) to be moved between a first position and a second position,
a first sealing arrangement (6, 7) arranged to seal, in the first position of the propulsion container, a first gap (17) between the propulsion container (1) and the trunk (5) to define a first watertight space on a second side of the first sealing arrangement, and
a second sealing arrangement (8) arranged essentially at the second end (4) of the propulsion container (1) and arranged to seal, in the second position of the propulsion container, a second gap between the propulsion container (1) and the trunk (5) to define a second watertight space on a second side of the second sealing arrangement, said second sealing arrangement (8) comprising a primary propulsion container seal (9) arranged in a functional connection with the surface of the second end (4) of the propulsion container (1).

2. A retractable thruster arrangement according to claim 1, characterised in that the primary propulsion container seal (9) is arranged on the surface of the second end (4) of the propulsion container (1).

3. A retractable thruster arrangement according to claim 1, characterised in that the second sealing arrangement (8) further comprises a secondary sealing surface (10) arranged on the surface of the second end (4) of the propulsion container (1) and a secondary propulsion container seal (11) arranged in a functional connection with said secondary sealing surface (10).

4. A retractable thruster arrangement according to claim 3, characterised in that the secondary propulsion container seal (11) is arranged on a seal holder (12) attachable to the trunk (5).

5. A retractable thruster arrangement according to claim 1, characterised in that the first sealing arrangement (6, 7) is arranged essentially at the first end (3) of the propulsion container (1).

6. A retractable thruster arrangement according to claim 1, characterised in that the first sealing arrangement (6, 7) comprises a primary seal (6) and a secondary seal (7).

7. A retractable thruster arrangement according to claim 6, characterised in that the primary seal (6) of the first sealing arrangement is arranged essentially at the first end (3) of the propulsion container (1) and the secondary seal (7) of the first sealing arrangement is arranged at a distance Dl from said primary seal (6).

8. A retractable thruster arrangement according to claim 1, characterised in that it further comprises means for moving the propulsion container between a first position and a second position, said means comprising a drive mechanism coupled between the trunk (5) and the propulsion container (1).

9. A vessel comprising at least one retractable thruster arrangement according to claim 1 and an opening (15) for accessing the thruster arrangement, said opening (15) being essentially smaller than the cross-section of the propulsion container (1).

10. A method for servicing a propeller driver arranged in a propulsion container of a retractable thruster arrangement in a vessel, said propulsion container having a first position wherein the propeller is below the base line of the vessel and a second position wherein the propeller is above the base line of the vessel, comprising the steps of
in the first position of the propulsion container, with a first sealing arrangement, forming a first watertight space above the upper surface of the propulsion container and below the water line, thus rendering the propulsion container accessible, and
in the second position of the propulsion container, with a second sealing arrangement, forming a second watertight space above the upper surface of the propulsion container and below the water line, thus rendering the propulsion container accessible.

* * * * *